(12) United States Patent
Hall et al.

(10) Patent No.: US 12,227,074 B2
(45) Date of Patent: Feb. 18, 2025

(54) CAPACITIVE TOUCH TEXTILES AND VEHICLE APPLICATIONS

(71) Applicant: Benecke-Kaliko AG, Hannover (DE)

(72) Inventors: De'Anna Hall, Frederick, MD (US);
Christopher Tyson, Clearbrook, VA (US); Lynn Kubik, Charles Town, WV (US); J. Ryan Bailey, Stephens City, VA (US); Harsh Sanghavi, Winchester, VA (US)

(73) Assignee: Benecke-Kaliko AG, Hannover (DE)

( * ) Notice: Subject to any disclaimer, the term of this patent is extended or adjusted under 35 U.S.C. 154(b) by 193 days.

(21) Appl. No.: 17/759,368

(22) PCT Filed: Jan. 22, 2021

(86) PCT No.: PCT/EP2021/051427
§ 371 (c)(1),
(2) Date: Jul. 23, 2022

(87) PCT Pub. No.: WO2021/148589
PCT Pub. Date: Jul. 29, 2021

(65) Prior Publication Data
US 2023/0140718 A1  May 4, 2023

Related U.S. Application Data

(60) Provisional application No. 62/964,670, filed on Jan. 23, 2020.

(51) Int. Cl.
*B60K 35/10* (2024.01)
*G06F 3/0354* (2013.01)
*G06F 3/044* (2006.01)

(52) U.S. Cl.
CPC .......... *B60K 35/10* (2024.01); *G06F 3/03547* (2013.01); *G06F 3/0443* (2019.05);
(Continued)

(58) Field of Classification Search
CPC ............ B60K 35/10; B60K 2360/1434; B60K 2360/1472; B60K 2360/42; B60K 35/28;
(Continued)

(56) References Cited

U.S. PATENT DOCUMENTS 5,202,581 A * 4/1993 Moore .................. B60Q 1/143
318/DIG. 2
2012/0242832 A1* 9/2012 Datta ................... G06V 20/584
362/465

(Continued)

FOREIGN PATENT DOCUMENTS

DE  102017119226 B3  10/2018
DE  102017220827 A1  5/2019
WO  2018013557 A1  1/2018

OTHER PUBLICATIONS

International Search Report and Written Opinion of the International dated Apr. 16, 2021 of International Application PCT/EP2021/051427 on which this application is based.

*Primary Examiner* — Muhammad Shafi
(74) *Attorney, Agent, or Firm* — Gregory Adams; Richard Wolf

(57) ABSTRACT

A vehicle interface system is disclosed. The system includes a conductive textile 100 and circuitry 408. The conductive textile 100 is configured to provide user input information, wherein the user input information is in response to contact with the conductive textile. The circuitry 408 is configured to analyze the user input information, identify a user input based on the user input information, and determine an associated command based on the identified user input.

8 Claims, 4 Drawing Sheets

(52) U.S. Cl.
CPC .............. *B60K 2360/1434* (2024.01); *B60K 2360/1472* (2024.01); *B60K 2360/42* (2024.01)

(58) Field of Classification Search
CPC ........ B60K 2360/146; B60K 2360/161; G06F 3/03547; G06F 3/0443; G06F 3/0202; G06F 3/041; G06F 3/044
USPC .......................................................... 701/36
See application file for complete search history.

(56) References Cited

U.S. PATENT DOCUMENTS

| | | | |
|---|---|---|---|
| 2017/0126228 A1* | 5/2017 | Gerken | H03K 17/9622 |
| 2018/0302983 A1* | 10/2018 | Osorio Dinis | G06F 3/0445 |
| 2019/0064963 A1* | 2/2019 | Horsch | B60K 37/20 |
| 2019/0135199 A1* | 5/2019 | Galan Garcia | B60K 35/00 |
| 2020/0296830 A1* | 9/2020 | Anton | H05K 1/181 |

* cited by examiner

CAPACITIVE TOUCH TEXTILES AND VEHICLE APPLICATIONS

FIELD

The field to which the disclosure generally relates is vehicles, and more particularly to vehicle interfaces or dashboards.

BACKGROUND

Automotive vehicles typically have instrument panels or dashboards that permit user input for various vehicle operations. These operations include operating music or media, adjusting climate controls, turning wipers on and the like. Typically, buttons and switches are used to make these adjustments.

Additionally, automotive vehicles are continually adding new systems or features that require user input or control. For example, some cars include seat warmers and seat coolers. These additional features increase the number of buttons required.

It is appreciated that the increased number of buttons and switches can create a confusing dashboard. Additionally, the overloaded dashboard may not be aesthetically pleasing.

What is needed is an improved vehicle interface system that can accommodate the additional features.

DRAWINGS

DETAILED DESCRIPTION

Figure 1:
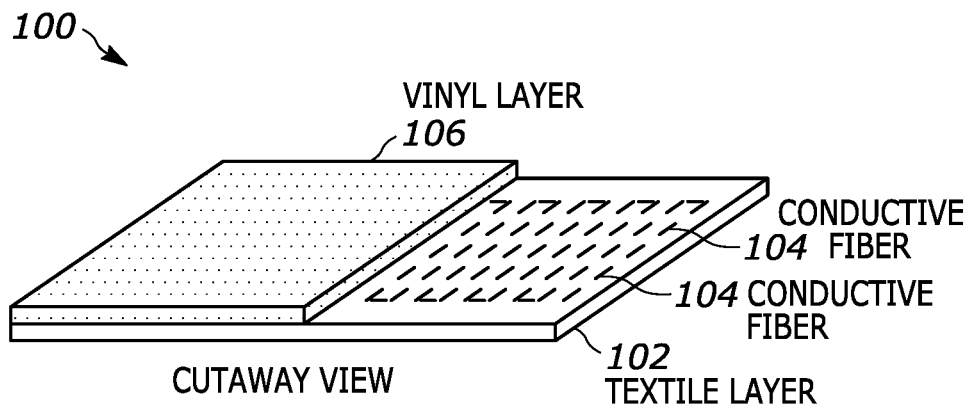
FIG. 1 is a diagram illustrating a conductive textile 100 in accordance with one or more embodiments.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context.

Also, in the summary of the disclosure and this detailed description, it should be understood that a range or dimension listed or described as being useful, suitable, or the like, is intended that any and every value or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Automotive vehicles typically have instrument panels or dashboards that permit user input for various vehicle operations. These operations include operating music or media, adjusting climate controls, turning wipers on and the like. Typically, buttons and switches are used to make these adjustments.

Additionally, automotive vehicles are continually adding new systems or features that require user input or control. For example, some cars include seat warmers and seat coolers. These additional features increase the number of buttons required.

It is appreciated that the increased number of buttons and switches can create a confusing dashboard. Additionally, the overloaded dashboard may not be aesthetically pleasing.

What is needed is an improved vehicle interface system that can accommodate the additional features.

One or more embodiments are included that utilize conductive/capacitive sensing for controlling and/or operating vehicle features.

Capacitive sensing is a technology based on capacitive coupling that can detect and measure anything that is conductive or has a dielectric different from air. Many types of sensors use capacitive sensing, including sensors to detect and measure proximity, pressure, position and displacement, force, humidity, fluid level, and acceleration.

The conductive or capacitive sensing can be incorporated into textiles, dashboard surfaces and the like.

A conductive textile is a fabric which can conduct electricity. Generally, conductive textiles include conductive strands, fibers or yarns woven into the construction of the textiles. The conductive textiles have conductive strands or yarns and non-conductive strands, fibers or yarn. These strands, fibers or yarns can be woven together. The conductive textiles can also have impregnated conductive materials, such as carbon or metal based powders.

Embodiments are disclosed that include a vehicle user interface that incorporates conductive textiles for operation. The user interface utilizes the conductive textiles for inputting information. The user interface can omit or mitigate the use of typical buttons, switches, knobs and the like.

FIG. 1 is a diagram illustrating a conductive textile 100 in accordance with one or more embodiments. The diagram is a cutaway view. It is appreciated that the diagram is provided for illustrative purposes and the suitable variations are contemplated. Further, the textile 100 is an example of a suitable textile that can be utilized for various embodiments or aspects.

The conductive textile 100 includes a textile layer 102 and an outer layer 106. The textile layer 102 includes a conductive fiber 104. The fiber 104 can be embedded or woven into the layer 102.

In one example, the conductive fiber 104 is arranged in rows and columns having selected spacing.

The outer layer 106 is a protective layer, such as vinyl. The outer layer has a thickness based on protecting the layer 102 while also allowing pressure/position to interact with individual conductive fibers.

The textile 100 utilizes capacitive sensing based on capacitive coupling to detect and/or measure contact with something that is conductive or has a dielectric property different from air. The textile 100 is configured to use capacitive sensing to sense or detect and measure proximity, pressure, position, displacement, force, humidity, fluid level, acceleration and the like, which can be provided as input information or user input information.

The textile 100 can also utilize conductive resistivity. Thus, the resistivity for an area or length of the textile 100 can vary in response to pressure or touch.

Figure 2:
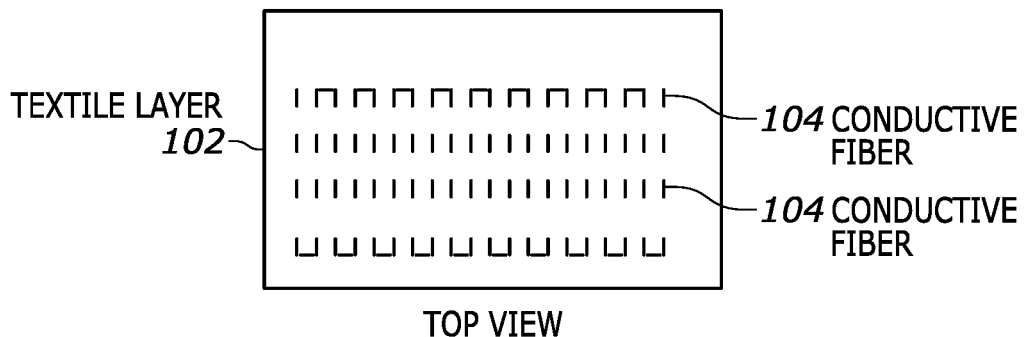
FIG. 2 is a top view of the textile layer 102 of the conductive textile 100 in accordance with one or more embodiments or aspects.

FIG. 2 is a top view of the textile layer 102 of the conductive textile 100 in accordance with one or more embodiments or aspects.

This view shows the conductive fibers arranged in a plurality of columns going from left to right across the page and a plurality of rows going from top to bottom of the page.

Figure 3:
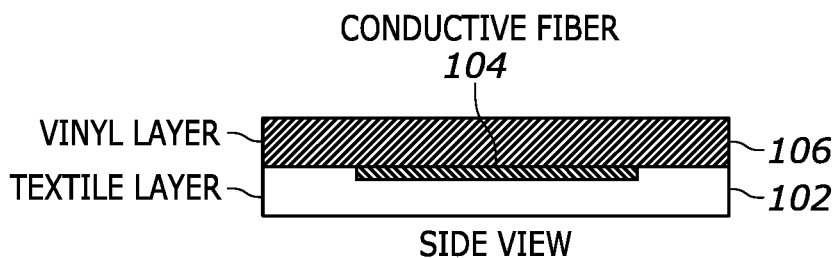
FIG. 3 is a side view of the conductive textile 100 in accordance with one or more embodiments or aspects.

FIG. 3 is a side view of the conductive textile 100 in accordance with one or more embodiments or aspects.

Here, the outer layer 106 is shown formed on the textile layer 102. An individual conductive fiber of the fibers 104 is shown within the layer 102.

Figure 4:
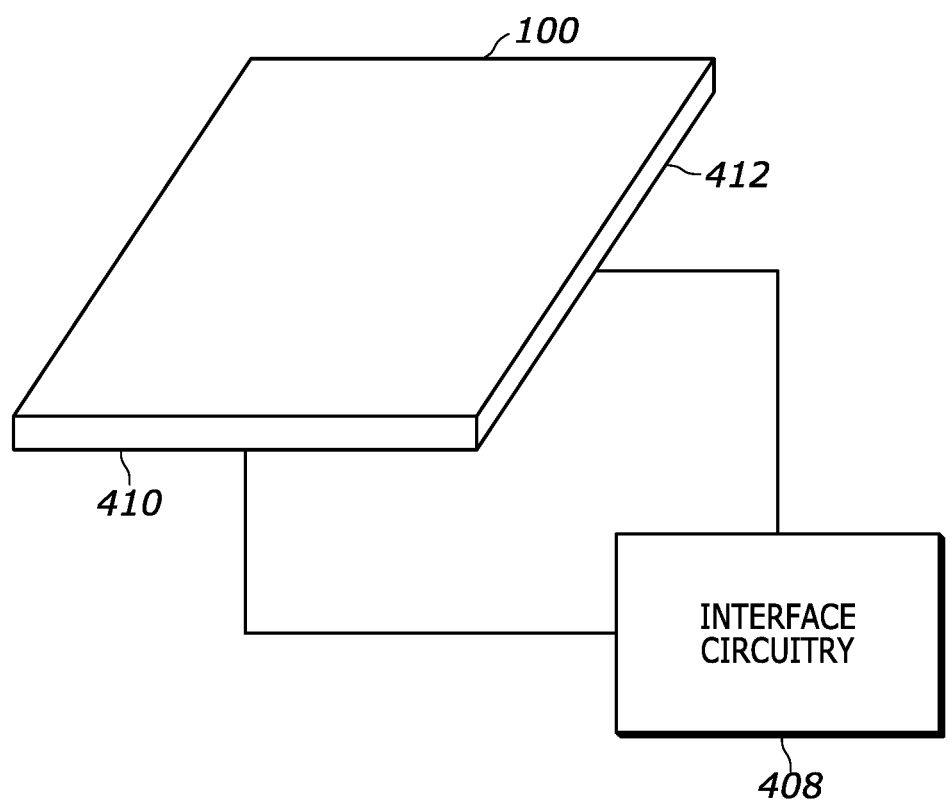
FIG. 4 is a diagram illustrating a vehicle interface system 400 in accordance with one or more embodiments or aspects.

FIG. 4 is a diagram illustrating a vehicle interface system 400 in accordance with one or more embodiments or aspects. It is appreciated that the diagram is provided for illustrative purposes and the suitable variations are contemplated.

It is appreciated that they interface system 400 can be utilized for marine applications.

The system 400 includes the conductive textile 100, interface circuitry 408, a first interface 410 and a second interface 412.

The connection interfaces 410 and 412 interface with the conductive textile 100. In one example, the first interface 410 is configured to provide a first coordinate or position (x) and the second interface 412 is configured to provide a second coordinate or position (y).

The circuitry 408 is connected to the interfaces 410 and 412 and is configured to receive input information or user input information from the textile 100.

In one example, the user input information is in the form of capacitive touch information. The information can also include conductive resistivity based information.

The user input information can be based on touch from a finger or other item that has a different dielectric from air, as described above.

The circuitry 408 analyzes the user input information to identify locations and timing of touching of the conductive textile 100. The circuitry 408 can utilize the locations and timing to identify inputs and/or associated commands. The inputs can include button pressing, swiping, dragging, gestures and the like.

The circuitry 408 can determine (x,y) position information from the interfaces 410 and 412.

The associated commands can include navigation commands, media control commands, heating and cooling commands, and the like.

As another example, the commands can be for vehicle control systems or control systems such as, engine speed, engine load, media, navigation, global positioning, communication, engine temperature, road speed, acceleration, wheel speed, steering angle, throttle position, fuel control, ignition control, idle speed, auto gearbox, antilock brake system (ABS), traction control, suspension control, tire pressure, tire load and the like.

As another example, the commands can be related to watercraft or marine applications, such as propulsion control, weather, navigation, radio communication, media, and the like.

The interface circuitry 408 generates signaling that conveys the commands to one or more vehicle systems, such as navigation control, heating and cooling, media systems, and the like.

Figure 5:
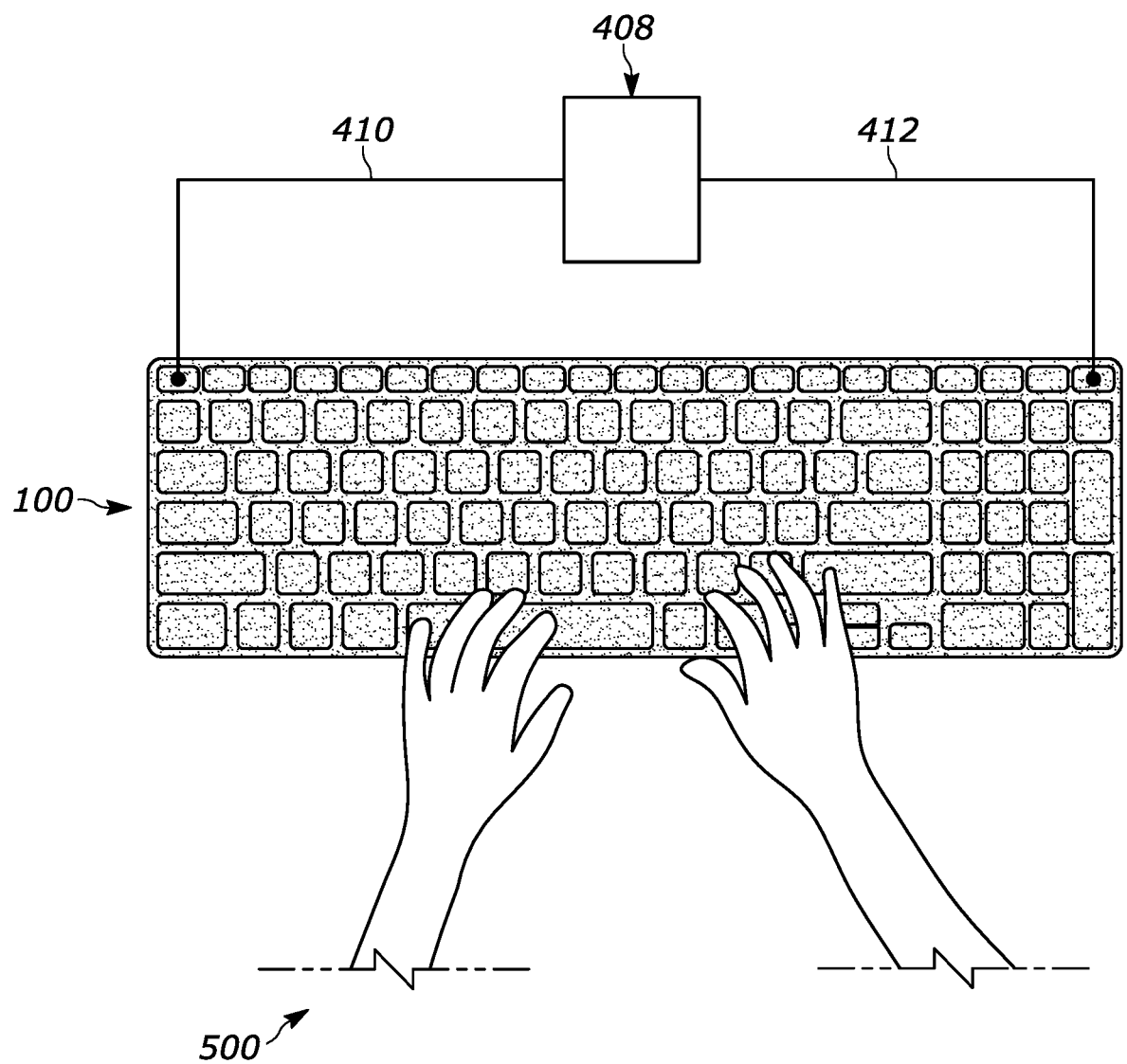
FIG. 5 is a diagram illustrating an interface system 500 in accordance with one or more embodiments.

FIG. 5 is a diagram illustrating an interface system 500 in accordance with one or more embodiments. The system 500 is provided for illustrative purposes as an example implementation.

The system 500 includes the conductive textile 100 and the circuitry 408. The circuitry 410 and 412 can be the connection from the circuitry 408 to the textile 100.

In this example, the conductive textile 100 receives user information associated with a keyboard. The black marks on the textile 100 correspond to keyboard positions and characters.

The circuitry 408 analyzes the user input information and identify when and which characters are touched.

Figure 6:
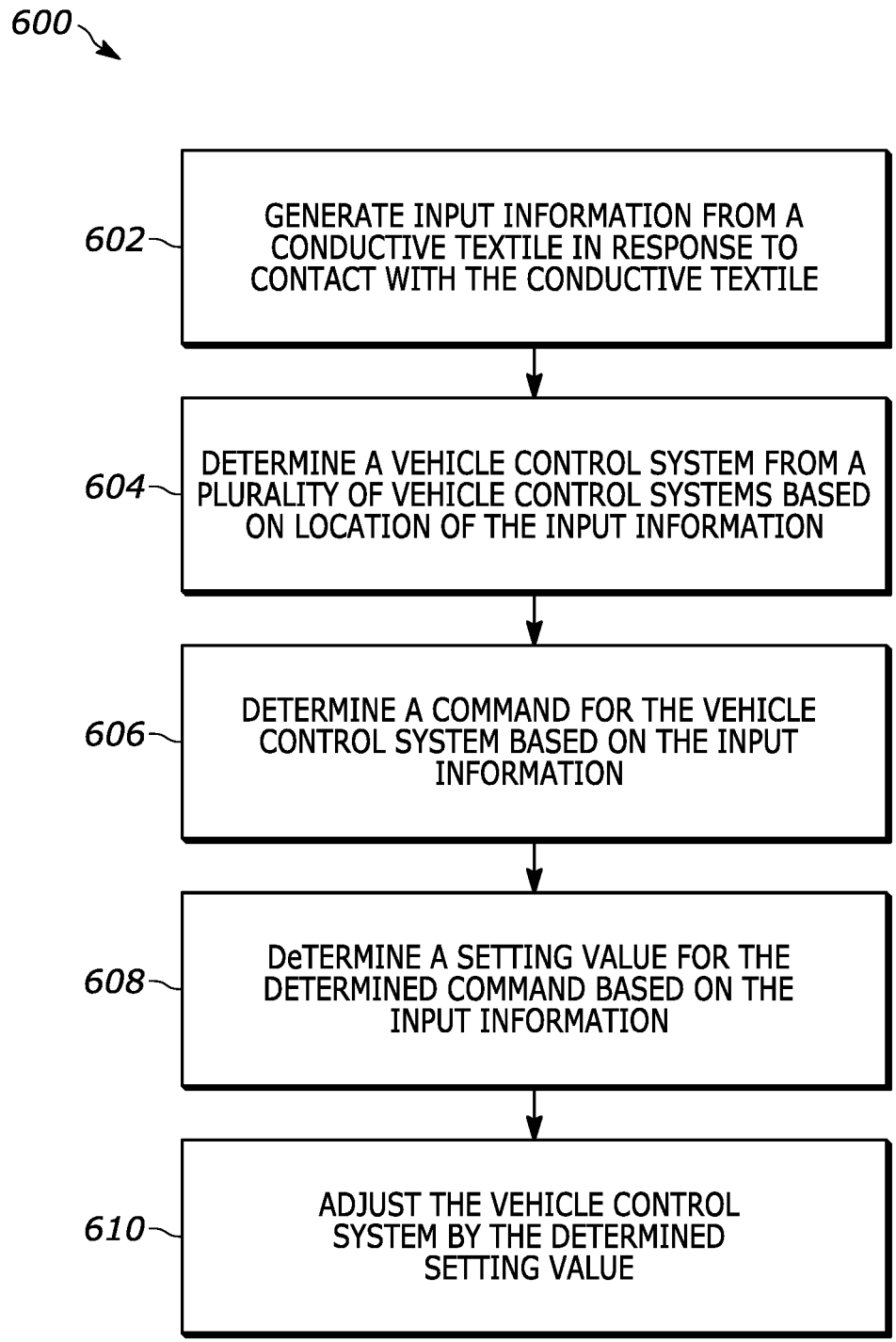
FIG. 6 is a flow diagram illustrating a method 600 of operating a vehicle interface system in accordance with one or more embodiments.

FIG. 6 is a flow diagram illustrating a method 600 of operating a vehicle interface system in accordance with one or more embodiments. The diagram is provided for illustrative purposes and it is appreciated that suitable variations are contemplated.

The method 600 can be performed with the above systems, including system 400, system 500 and variations thereof.

A conductive textile generates input information in response to contact with the conductive textile at 602. The contact can include a user touching a surface of the conductive textile.

Circuitry (such as circuitry 408) determines a vehicle control system from a plurality of vehicle control systems based on location of the input information at 604. The plurality of vehicle control systems include engine speed, engine load, engine temperature, road speed, acceleration, wheel speed, steering angle, throttle position, fuel control, ignition control, idle speed, auto gearbox, antilock brake system (ABS), traction control, suspension control, tire pressure, tire load, windshield wiper control, headlight control, seat temperature control and the like.

In one example, the plurality of vehicle control systems have assigned regions or areas of the conductive textile.

The circuitry determines a command for the vehicle control system based on the input information at 606. The command can include temperature adjustment, headlight setting and the like.

The circuitry determines a setting value at 608 based on the input information.

The circuitry causes the determined vehicle control system to adjust itself based on the setting value at 610.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

One general aspect includes an interface system, which includes a conductive textile 100 configured to provide user input information, where the user input information is in response to contact with the conductive textile; and circuitry configured 408 to analyze the user input information, identify a user input based on the user input information, and determine an associated command based on the identified user input.

Implementations may include one or more of the following features. The interface system where the interface system is a vehicle interface system. The interface system is a watercraft vessel interface system. The associated command operates a multimedia device. The associated command is for a marine control system. The user input information is a gesture or swipe. The circuitry is configured to identify a control system and send the associated command to the identified control system. The identified control system is a marine propulsion control. The conductive textile is capacitive touch enabled and uses a conductive touch of a human finger or a specialized device. The identified control system is one or more of engine speed, engine load, engine temperature, road speed, acceleration, wheel speed, steering angle, throttle position, fuel control, ignition control, idle speed, auto gearbox, antilock brake system (abs), traction control, suspension control, tire pressure, and tire load. Implementations of the described techniques may include hardware, a method or process, or computer software on a computer-accessible medium.

One general aspect includes a vehicle interface system, which includes a vehicle surface 100 configured to provide capacitive sensing information as input information based on contact with the vehicle surface; and circuitry 408 configured to analyze the input information to determine a vehicle control system based on location of the input information, determine a command for the vehicle control system and determine a setting value for the determined command based on the input information.

Implementations may include one or more of the following features. The system where the vehicle surface is a conductive textile. The vehicle control system is one of engine speed, engine load, engine temperature, road speed, acceleration, wheel speed, steering angle, throttle position, fuel control, ignition control, idle speed, auto gearbox, antilock brake system (abs), traction control, suspension control, tire pressure, and tire load. The vehicle control system is vehicle climate control, the command is heat temperature and the setting value is a selected temperature. The vehicle surface is an automotive seat. The vehicle surface is a dashboard. Implementations of the described techniques may include hardware, a method or process, or computer software on a computer-accessible medium.

One general aspect includes a method of operating a vehicle interface system. The method of operating also includes generating input information from a conductive textile in response to contact with the conductive textile. The method of operating also includes determining a vehicle control system from a plurality of vehicle control systems based on location of the input information. The method of operating also includes determining a command for the vehicle control system based on the input information. The method of operating also includes determining a setting value for the determined command based on the input information. The method of operating also includes adjusting the vehicle control system by the determined setting value.

Implementations may include one or more of the following features. The method the plurality of vehicle control systems including a climate control system, a windshield wiper control system, a headlight control system and a seat temperature system. The input information is based on a gesture. Implementations of the described techniques may include hardware, a method or process, or computer software on a computer-accessible medium.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An interface system comprising:
   a conductive textile configured to provide user input information based on a user contact, wherein the user input information is in response to contact with the conductive textile;
   a textile layer of the conductive textile;
   a conductive fiber woven into the textile layer and arranged in rows and columns having a selected spacing;
   a vinyl protective layer formed on the conductive fiber and the textile layer;
   the conductive textile has resistivity based in response to pressure by the user contact and has a plurality of regions assigned to a plurality of control systems;
   a first interface of the conductive textile to provide a first coordinate;
   a second interface of the conductive textile to provide a second coordinate;
   an interface circuitry to analyze the user input information and the first coordinate from the first interface and the second coordinate from the second interface to identify an assigned region, the circuitry determines a control system of the plurality of control systems based on the identified assigned region, the circuitry determines a command based on the user input information and the first coordinate and the second coordinate and the determined control system.

2. The interface system of claim 1, wherein the interface system is a vehicle interface system.

3. The interface system of claim 1, wherein the user input information is a gesture.

4. The interface of claim 1, wherein the conductive textile is capacitive touch enabled and uses a conductive touch of a human finger.

5. The system of claim 1, the conductive textile comprises marks that correspond to characters of a keyboard.

6. The system of claim 1, wherein the conductive textile is an automotive seat.

7. The system of claim 1, wherein the conductive textile is a dashboard.

8. A method of operating a vehicle interface system, the method comprising:

arranging conductive fibers into a conductive textile having into a plurality of columns and a plurality of rows;

a user contact generating input information from a conductive textile having the conductive fibers woven into a textile layer, a protective layer formed on the textile layer and a textile interface;

an interface circuitry determining location information and timing information of the input information using the plurality of rows and the plurality of columns;

the interface circuitry assigning regions of the conductive textile into a plurality of control systems;

the interface circuitry determining a vehicle control system of the plurality of control systems based on the determined location and the assigned regions; and the interface circuitry determining a command based on the determined vehicle control system and the determined location.

* * * * *